(12) United States Patent
Ogasahara et al.

(10) Patent No.: US 7,311,474 B1
(45) Date of Patent: Dec. 25, 2007

(54) PELLET LOADER

(75) Inventors: Minoru Ogasahara, Kyoto (JP);
Tatsuya Ueki, Kyoto (JP)

(73) Assignee: ITSWA Co., Ltd., Kyoto (JP)

( * ) Notice: Subject to any disclaimer, the term of this patent is extended or adjusted under 35 U.S.C. 154(b) by 0 days.

(21) Appl. No.: 11/649,630

(22) Filed: Jan. 4, 2007

(51) Int. Cl.
*B65G 53/10* (2006.01)

(52) U.S. Cl. .......................... 406/143; 406/92; 406/93; 406/146; 406/153; 406/194

(58) Field of Classification Search ................. 406/92, 406/93, 94, 95, 142, 143, 134, 141, 146, 406/151, 152, 153, 194
See application file for complete search history.

(56) References Cited

U.S. PATENT DOCUMENTS

| | | | |
|---|---|---|---|
| 3,345,111 A * | 10/1967 | Bies et al. | 406/138 |
| 4,018,185 A | 4/1977 | Myers | |
| 4,358,226 A * | 11/1982 | Nagata et al. | 406/82 |
| 4,367,685 A * | 1/1983 | Frame et al. | 110/347 |
| 4,387,852 A * | 6/1983 | Mattson et al. | 239/143 |
| 4,548,001 A * | 10/1985 | Link | 451/38 |
| 4,586,854 A * | 5/1986 | Newman et al. | 406/153 |
| 4,812,086 A * | 3/1989 | Kopernicky | 406/153 |
| 5,015,126 A * | 5/1991 | Kramer | 406/152 |
| 5,037,246 A * | 8/1991 | Okano et al. | 406/152 |
| 5,690,450 A * | 11/1997 | Miller et al. | 409/39 |
| 5,727,908 A * | 3/1998 | Ward | 406/36 |
| 6,234,722 B1 * | 5/2001 | Pfeiffer | 406/153 |
| 6,398,462 B1 * | 6/2002 | Fulkerson | 406/134 |
| 6,708,715 B2 * | 3/2004 | Duebel et al. | 137/102 |

FOREIGN PATENT DOCUMENTS

| | | |
|---|---|---|
| JP | 53-85085 | 7/1978 |
| JP | 63-48729 | 9/1986 |
| JP | 63-59139 | 4/1988 |
| JP | 2-147518 | 6/1990 |
| JP | 2002-18327 | 1/2002 |

* cited by examiner

*Primary Examiner*—Joe Dillon, Jr.
(74) *Attorney, Agent, or Firm*—Kirschstein, et al.

(57) ABSTRACT

A pellet loader according to the present invention is provided with an ejector portion 1. A gas supply pipe 2 is connected to an injection nozzle 11 of the ejector portion 1 for supplying compressed gas from a compressed gas source 8. An insert pipe 4 is connected to a suction inlet 12 of the ejector portion 1. Pellets are sucked from the suction inlet 40 of the insert pipe 4 into the ejector portion 1. A gas pipe 5 is arranged along the insert pipe 4 and one end of the gas pipe 5 has an opening 50 positioned at the vicinity of the suction inlet 40 of the insert pipe 4 and faced to the suction inlet 40 of the insert pipe 4 for injecting the compressed gas into the insert pipe 4. A transport pipe 3 is connected to an outlet portion 14 of the ejector portion 1.

8 Claims, 7 Drawing Sheets

PELLET LOADER

TECHNICAL FIELD

The present invention relates to a pellet loader for transporting pellets stored in a container to a predetermined place through a transport pipe by compressed gas.

BACKGROUND ART

When transporting pellets stored in a container to a predetermined place, a pellet loader is used. As one of pellet loaders, an ejector type employing with compressed gas is known in the prior art.

As shown in FIG. 7, the ejector-type pellet loader comprises an ejector portion 1 having an injection nozzle 11 to which a gas supply pipe 2 is connected. A suction inlet 12 of the ejector portion 1 is provided with an insert pipe 4 and a transport pipe 3 is connected to an outlet portion 14 of the ejector portion 1.

When this pellet loader is used, the insert pipe 4 is inserted among pellets 6 stored in a container 7. Compressed gas is fed into the ejector portion 1 from a compressed gas source through the gas supply pipe 2, whereby the pellets 6 are sucked into the ejector portion 1 from a suction inlet 40 of the insert pipe 4 and transported to a predetermined place through the transport pipe 3.

SUMMARY OF THE INVENTION

Since the above-mentioned ejector-type pellet loader has a simple structure, it is often used when transporting pellets stored in a container to a predetermined place. However, a small-sized pellet loader is equipped with a small and long insert pipe to suck pellets, therefore, it has a problem in that pellets are entwined inside the insert pipe and clog it.

Particularly, in case that pellets are made of resin including fiberglass, they are entwined with each other due to a fiber end protruding from the surface thereof, which reduced the transportation efficiency remarkably. In addition, an insert pipe sucks moistened outside air together with pellets, so that the pellets are humidified during sucking, which causes a problem in that the dimensional accuracy and change in material quality during machining are affected.

It is, therefore, an object of the present invention to provide a pellet loader capable of smoothly transporting pellets without blockage in the insert pipe.

In order to achieve the above-mentioned object, the present invention provides a pellet loader for transporting pellets stored in a container to a plastic processing machine through a transport pipe by compressed gas, comprising: an ejector portion; a compressed gas source; a gas supply pipe for supplying the injection nozzle with compressed gas, one end of the gas supply pipe being connected to the compressed gas source, the other end of the supply pipe being connected to an injection nozzle of the ejector portion; an insert pipe adapted for inserting into the container, one end of the insert pipe being connected to a suction inlet of the ejector portion and extending from the suction inlet, the other end of the insert pipe having a suction inlet for sucking the pellets into the ejector portion; and a gas pipe extending along the insert pipe, one end of the gas pipe having an opening positioned at the vicinity of the suction inlet of the insert pipe and faced to the suction inlet of the insert pipe, compressed gas being supplied from the other end of the gas pipe; wherein the transport pipe is connected to an outlet portion of the ejector portion.

In the specification, the term "pellet" means a particulate matter, particularly, a resin pellet, a metal pellet, or the like or more particularly, a material made by combining a particular matter with powder. In addition, the term "container" means a solid plastic container, a metallic container, flexible bag or the like.

According to a preferred embodiment of the present invention, the opening of the gas pipe is provided with a nozzle for injecting the compressed gas toward the suction inlet of the insert pipe in such a manner that the compressed gas flow spreads in a fan-like manner or conically.

According to another preferred embodiment of the present invention, the gas pipe has another opening airtightly connected and communicating with an opening formed in the middle of the insert pipe for injecting the compressed gas into the insert pipe.

According to further preferred embodiment of the present invention, the compressed gas is dried compressed gas.

According to further preferred embodiment of the present invention, the plastic processing machine is a resin pellet drying machine, or a plastic injection molding machine, or a plastic extruder.

According to further preferred embodiment of the present invention, the insert pipe is arranged eccentrically to a center of the injection nozzle of the ejector portion.

According to further preferred embodiment of the present invention, the suction inlet of the insert pipe is arranged obliquely to the axial direction of the insert pipe.

According to further preferred embodiment of the present invention, the other end of the gas pipe is connected to a branch portion of the gas supply pipe.

According to further preferred embodiment of the present invention, the container is an airtight flexible bag or an airtight container.

According to the present invention, the pellet loader is provided with the gas pipe and compressed gas is supplied to the insert pipe from the suction inlet thereof in the pellet suction direction.

Supplying compressed gas to the ejector from the gas supply pipe causes the pressure reduction inside the ejector, so that pellets are sucked from the insert pipe. In addition, the compressed gas from the gas pipe provides fluid energy to suction airflow flowing through the insert pipe, and diffusion airflow such as rotational flow, turbulent flow or the like is generated inside the insert pipe. This diffusion airflow continuously feed the pellets through the insert pipe while being rotated, diffused and floated without the pellets entwining with each other, so that blockage in the insert pipe is prevented and the transportation efficiency and suction efficiency is increased much more.

Furthermore, gas is refilled by compressed gas from the gas pipe so as to compensate the gas discharged externally by the suction.

Accordingly, in the case that resin pellets are stored in the airtight container composed of dried gas and that dried compressed gas is fed from the gas supply pipe and gas pipe, moistened air is not introduced into the insert pipe but substantially completely dried resin pellets are transported into a plastic processing machine, which is unlikely to affect dimensional accuracy and change in material quality during processing.

In addition, even if the container is an airtight flexible bag or an airtight container, the pressure inside the container is not reduced and the container is not crushed.

BRIEF DESCRIPTION OF THE DRAWINGS

FIG. 4 (B) is a partial cross-sectional view illustrating the lower end portion of the gas pipe of further embodiment of the present invention.

FIG. 4 (C) is a plan view of a nozzle shown in the direction of an arrow X in FIG. 4 (B)

DESCRIPTION OF THE PREFERRED EMBODIMENT

The pellet loader according to the present invention will be described in detail hereinafter with reference to the attached drawings.

Figure 1:
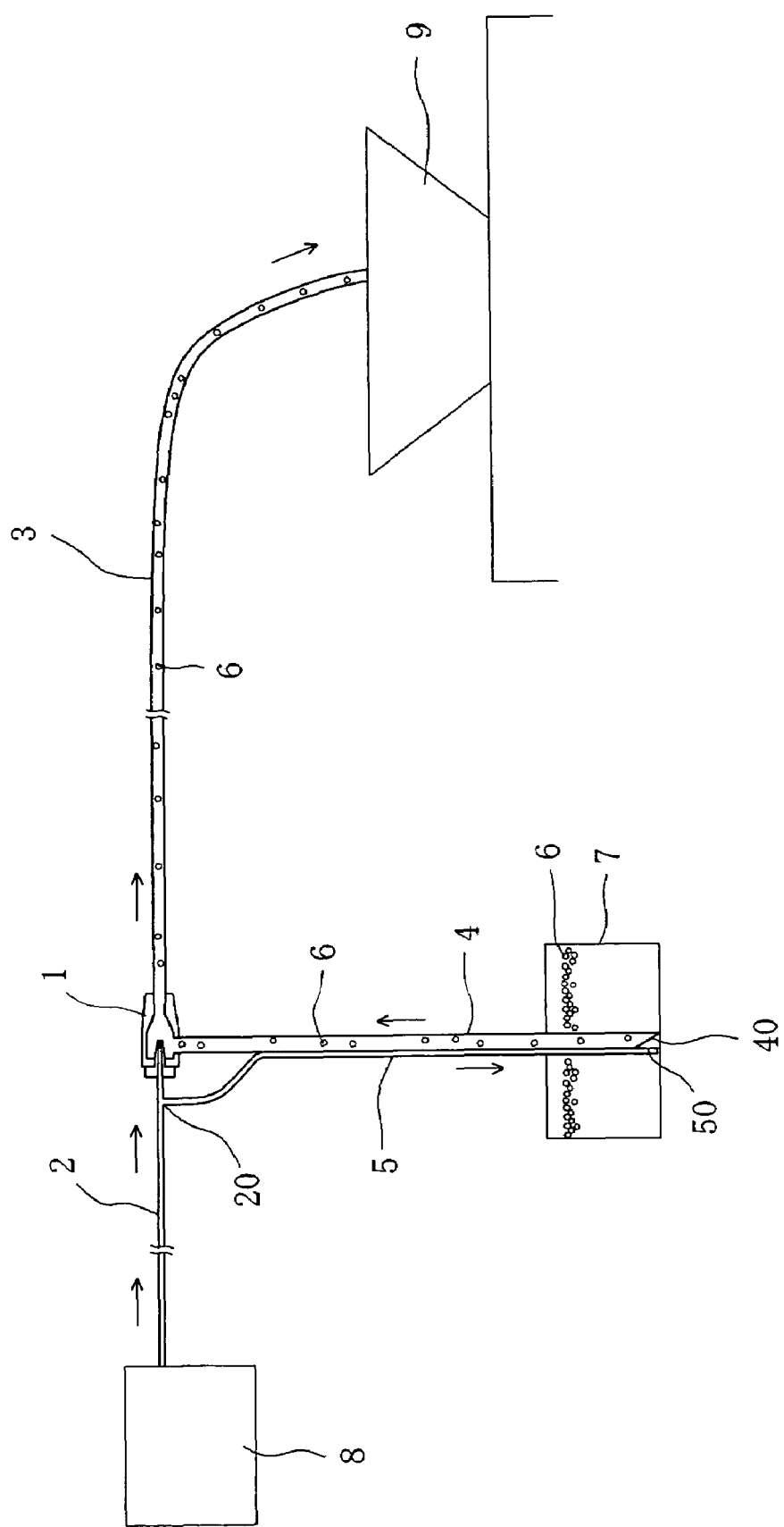
FIG. 1 is a view illustrating a pellet loader of an embodiment of the present invention, in which the pellet loader is in use.
Figure 2:
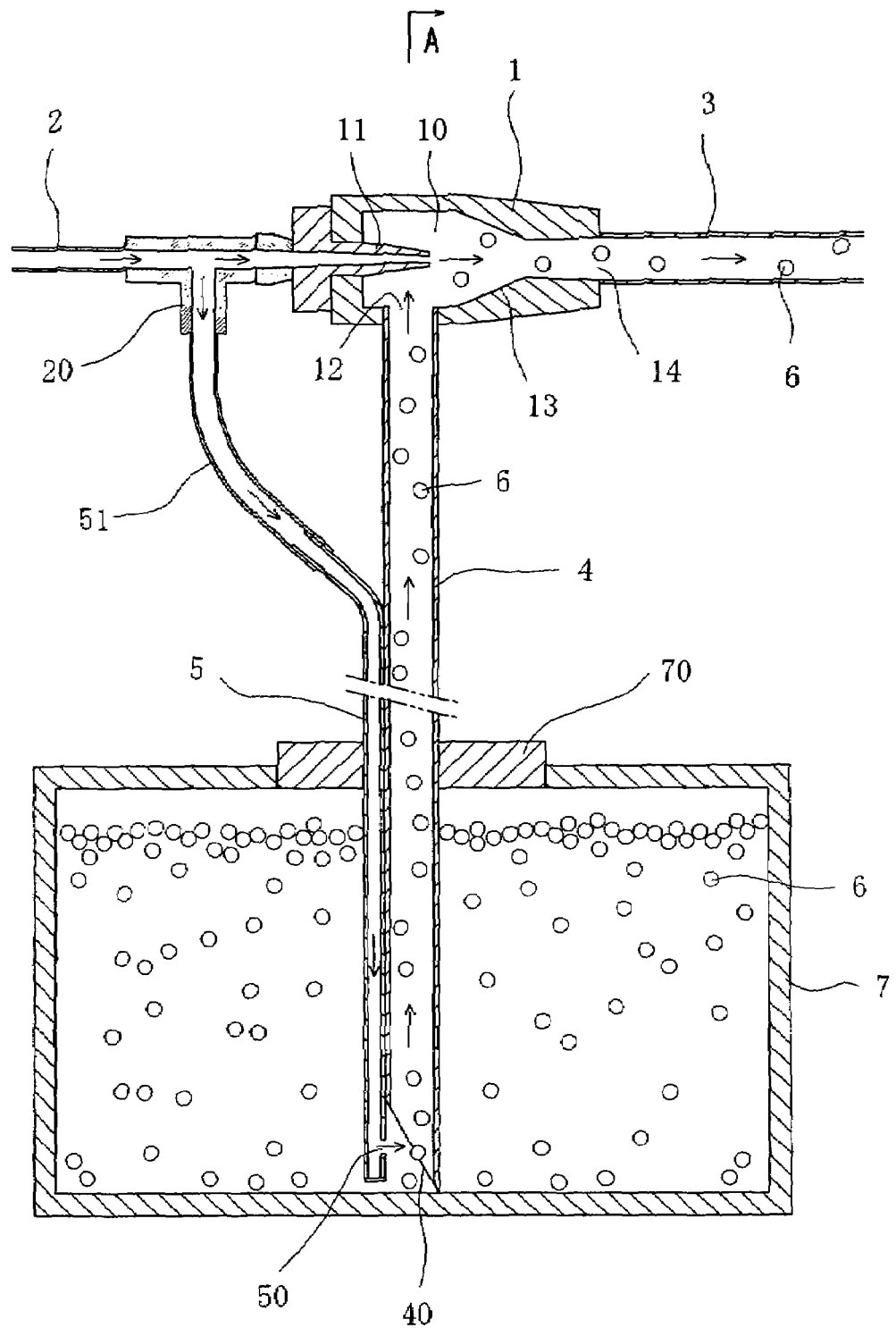
FIG. 2 is a cross-sectional view illustrating a structure and an operation of the pellet loader shown in FIG. 1.
Figure 3:
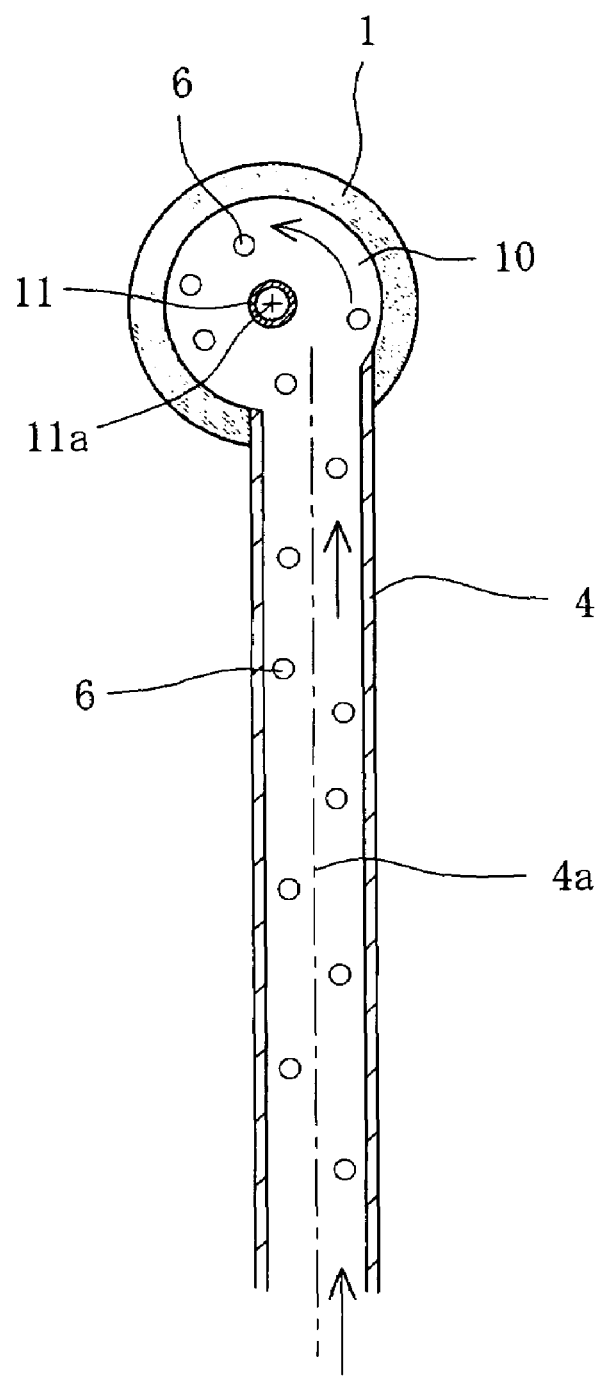
FIG. 3 is a partial cross-sectional view along A-A line in FIG. 2.

FIG. 1 is a view of a pellet loader according to an embodiment of the present invention, in which the pellet loader is in use. FIG. 2 is a cross-sectional view for illustrating a structure and operation of the pellet loader shown in FIG. 1. FIG. 3 is a partial cross-sectional view along A-A line in FIG. 2.

Referring to FIGS. 1 and 2, the reference numeral 1 designates an ejector portion and the reference numeral 10 designates a low pressure chamber arranged in the ejector portion 1. The ejector portion 1 is provided with an injection nozzle 11 in the low pressure chamber 10. A gas supply pipe 2 is connected to the injection nozzle 11. One end (upper end) of an insert pipe 4 is connected to a suction port 12 of the ejector portion 1. The insert pipe 4 is adapted to suction pellets 6 into the low pressure chamber 10 of the ejector portion 1. In addition, the ejector portion 1 is provided with a diffuser 13, and the diffuser 13 is provided with an outlet portion 14 of the ejector portion 1. In the present embodiment, the pellet 6 is a resin pellet, however, it may be particular matter made by combining a resin pellet with metal or powder.

A transport pipe 3 for feeding the resin pellets 6 into a plastic processing machine 9 is connected to the outlet portion 14 of the ejector portion 1. This plastic processing machine 9 is a resin pellet drying machine, a plastic molding machine, a plastic extruder, or the like. One end (inlet) of the gas supply pipe 2 is connected to a compressed gas source 8 comprised of a compressor and so on. Compressed gas composed of air, nitrogen and so on is supplied to an injection nozzle 11 of the ejector portion 1 through the gas supply pipe 2 from the compressed gas source 8.

A gas pipe 5 is arranged along the insert pipe 4. The gas pipe 5 has one end (upper end) connected to a branch portion 20 of the other end (outlet) of the gas supply pipe 2 through a connection pipe 51. The branch portion 20 is connected to the nozzle portion 11 of the ejector portion 1. Accordingly, compressed gas from the compressed gas source 8 flows through the gas supply pipe 2, and then is distributed by the branch portion 20 and fed into the ejector portion 1 and gas pipe 5.

The other end (lower end) of the insert pipe 4 has a suction inlet 40 arranged obliquely at about 30° to the axial direction of the insert pipe 4. In addition, the other end (lower end) of the gas pipe 5 is extended substantially to the lower end of the insert pipe 4 and closed. The gas pipe 5 is provided with an opening 50 at a side wall in the vicinity of the lower end thereof and the opening 50 faces the suction inlet 40 of the insert pipe 4. In this case, the opening 50 is pointed in a direction substantially at right angle or at any angle to the inner periphery wall of the insert pipe 4 faced to the opening 50. Accordingly, the compressed gas supplied to the gas pipe 5 is blown out from the opening 50 into the insert pipe 4.

When the pellet loader is used, first, the suction inlet 40 of the insert pipe 4 is inserted among resin pellets 6 stored in a container 7. And then, the outlet portion of the transport pipe 3 is connected to the plastic processing machine 9. After that, the compressed gas source 8 is activated and compressed gas is injected from the injection nozzle 11 of the ejector portion 1 to the low pressure chamber 10 through the gas supply pipe 2. Then the compressed gas in the low pressure chamber 10 is fed into the diffuser 13 so as to generate suction force. The resin pellets 6 in the container 7 are sucked from the suction inlet 40 of the insert pipe 4 to the low pressure chamber 10. After that, the resin pellets 6 are transported to the plastic processing machine 9 from the outlet portion 14 of the ejector portion 1 through the transport pipe 3.

As described above, the compressed gas is fed from the opening 50 of the gas pipe 5 in the suction direction of the insert pipe 4, so that the fluid energy is given to the suction airflow inside the insert pipe 4. The fluid energy causes diffusion airflow composed of rotational airflow, turbulent airflow or the like to be generated in the insert pipe 4. The diffusion airflow carries the resin pellets 6 through the insert pipe 4 with the resin pellets 6 floated, whirled and dispersed, and the pellets 6 can be transported without blockage in the insert pipe 4.

In the embodiment, the compressed gas is fed into the ejector portion 1 at the same flow rate that the compressed gas is fed into the gas pipe 5. However, even if the former flow rate is up to 1.6 times higher than the latter flow rate, it is confirmed that the same diffusion effect and transportation effect can be obtained.

Furthermore, the compressed gas is fed into the insert pipe 4 through the gas pipe 5 so as to compensate the gas discharged externally from the container 7 by suction of the insert pipe 4. Thus, even if the container is airtightly sealed with a lid 70, the pressure inside the container is not reduced under the atmospheric pressure, preventing the suction effect from decreasing.

Accordingly, according to the present invention, the container 7 airtightly sealed with dried gas filled therein and the resin pellets 6 are sucked into the ejector portion 1 by dried compressed gas and fed from the ejector portion 1, so that almost perfectly dried resin pellets 6 are supplied to the plastic processing machine 9, causing an adverse effect on dimensional accuracy and so on to be reduced remarkably.

In addition, introducing the compressed gas into the insert pipe 4 prevents the container 7 from having low pressure or being crushed even if the container 7 is an airtight flexible bag or an airtight container.

Furthermore, the suction inlet 40 of the insert pipe 4 is arranged obliquely to the axial direction of the insert pipe 4, which causes the suction inlet 40 to face sideward and only the resin pellets 6 to be sucked without sucking a wall of a container 7 even if the container is an airtight flexible bag. Accordingly, the suction inlet 40 of the insert pipe 4 can be sucked with it in contact with the bottom of the container 7, which can transport all the resin pellets 6 in the container 7 certainly.

In addition, as shown in FIG. 3, a central axis 4a of the insert pipe 4 is arranged eccentrically to a center 11a of the injection nozzle 11 of the ejector portion 1. Thus, whirling airflow in the low pressure chamber 10 is fed to the outlet portion 14 of the ejector portion 1, so that the resin pellets 6 sucked from the insert pipe 4 are transported to the transport pipe 3 while being diffused and dispersed. This enables the resin pellets 6 to be transported without being entwined in the ejector portion 1.

Figure 4:
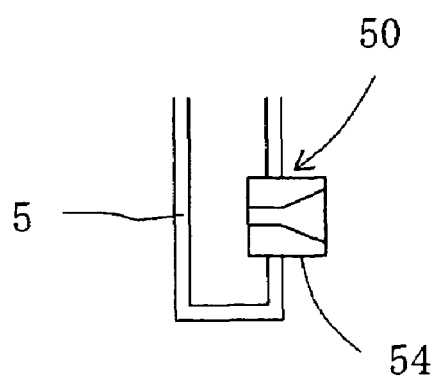
FIG. 4 (A) is a partial cross-sectional view illustrating the lower end portion of the gas pipe of another embodiment of the present invention.
Figure 4:
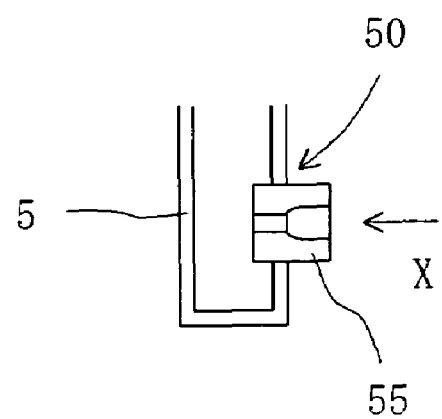
Figure 4:
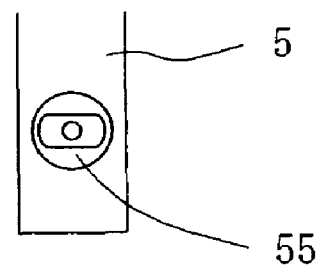

In the above-mentioned embodiment, as is obvious from FIG. 2, the compressed gas flow from the opening 50 keeps intensively hitting the limited area of peripheral wall of the insert pipe 4, so that the area of the insert pipe 4 is possibly perforated. In order to avoid such disadvantage, according to another embodiment of the present invention, as shown in FIG. 4 (A), the opening 52 of the gas pipe 5 is provided with a nozzle 54 for injecting the compressed gas toward the suction inlet 40 of the insert pipe 4 in such a manner that the compressed gas flow spreads conically. Instead of the nozzle 54, it is also possible to use a nozzle 55 shown in FIGS. 4 (B) and (C) which injects the compressed gas toward the suction inlet 40 of the insert pipe 4 in such a manner that the compressed gas flow spreads in a fan-like manner.

Figure 5:
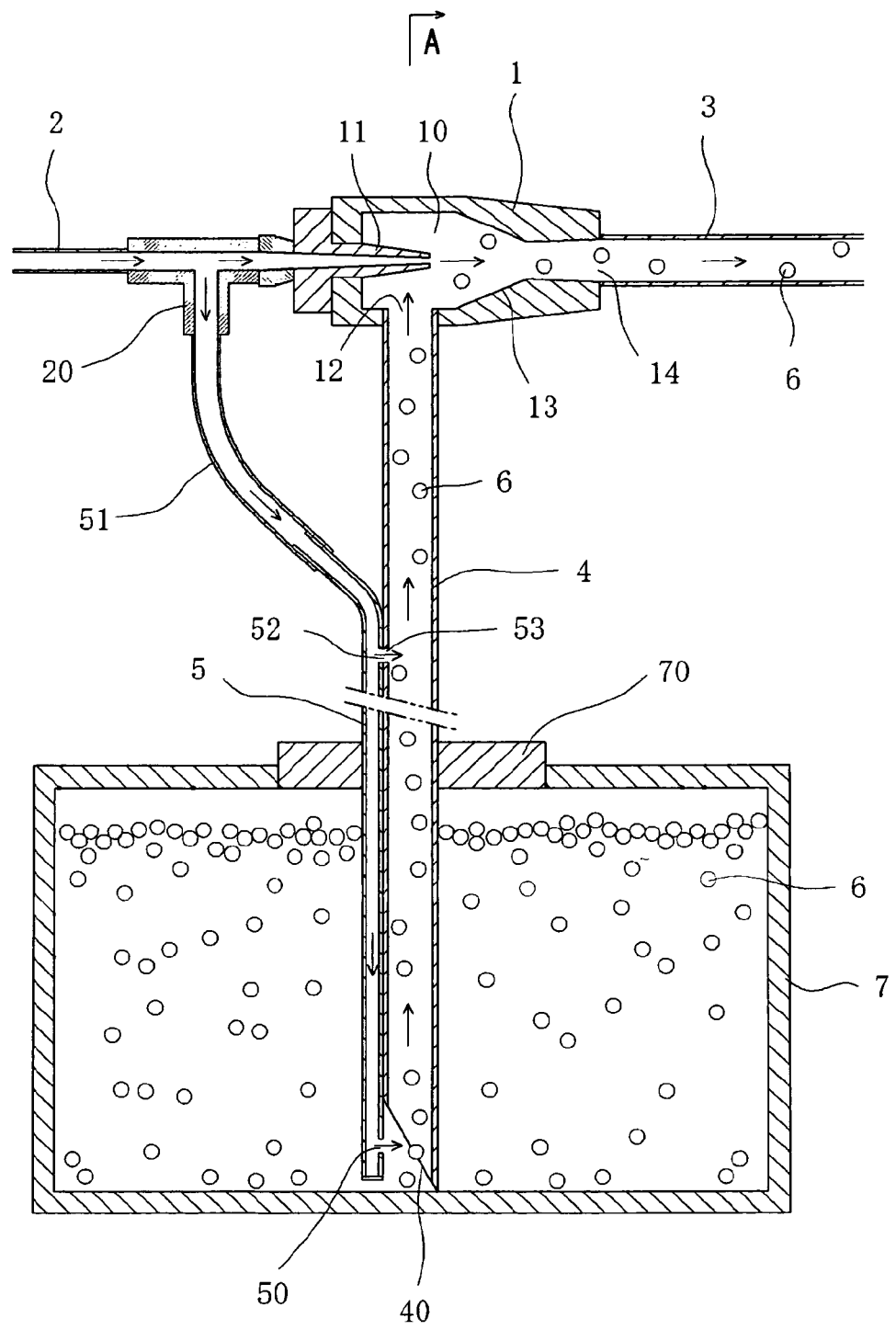
FIG. 5 is a cross-sectional view of a pellet loader according to another embodiment of the present invention.

FIG. 5 is a cross-sectional view of a pellet loader according to another embodiment of the present invention. The pellet loader shown in FIG. 5 is different from the pellet loader shown in FIG. 2 only in the feature that the gas pipe 5 has another opening 52 airtightly connected and communicating with an opening 53 formed in the middle of the insert pipe 4 for injecting compressed gas into the insert pipe 4. According to the embodiment shown in FIG. 5, in the case that the container 7 is an airtight one, even though the insert pipe 4 is relatively long and has relatively narrow internal diameter, there is no danger of giving rise to blockage of the insert pipe 4.

Figure 6:
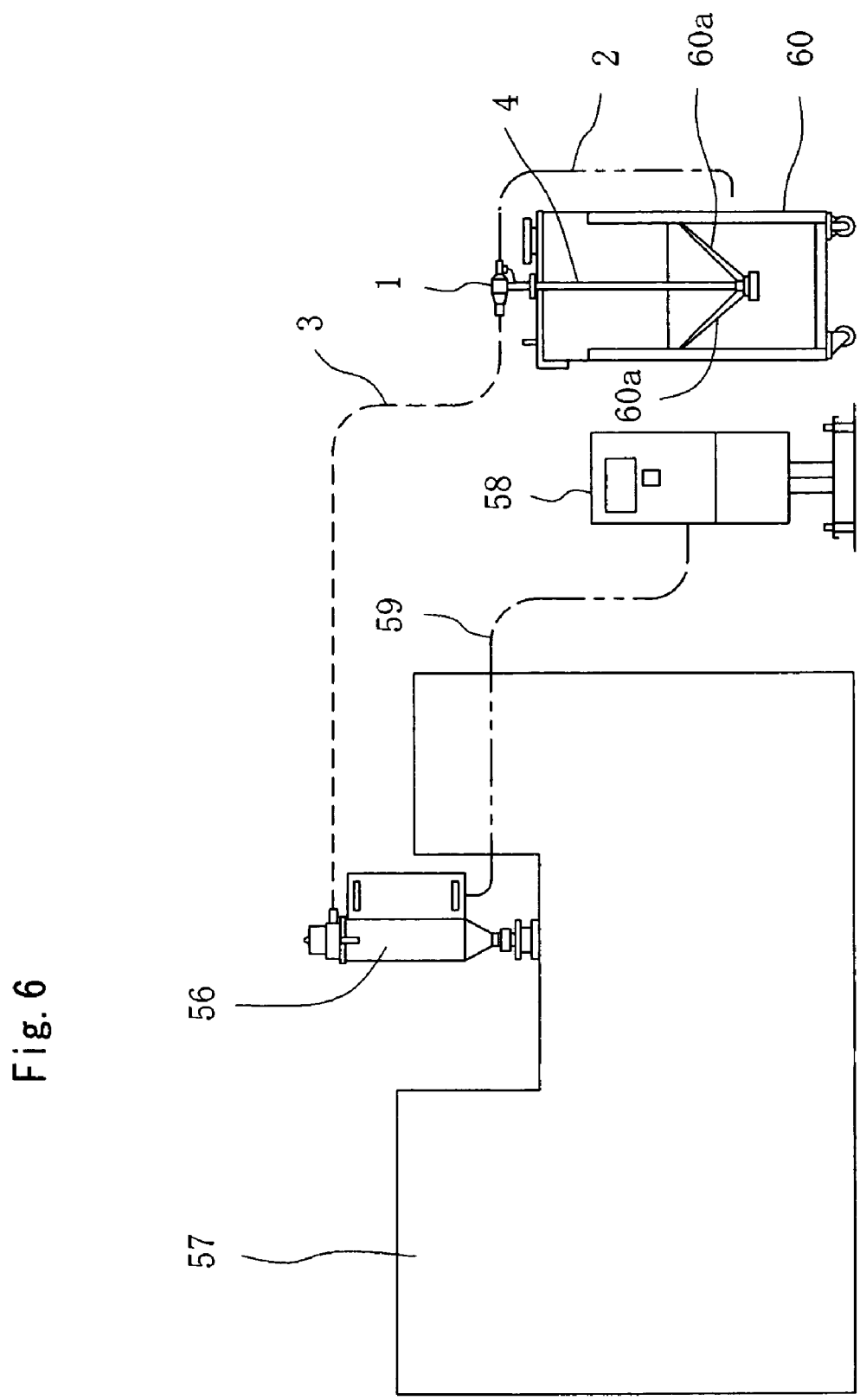
FIG. 6 is a plan view illustrating a pellet loader of the present invention used in conjunction with a resin pellet drying machine.
Figure 7:
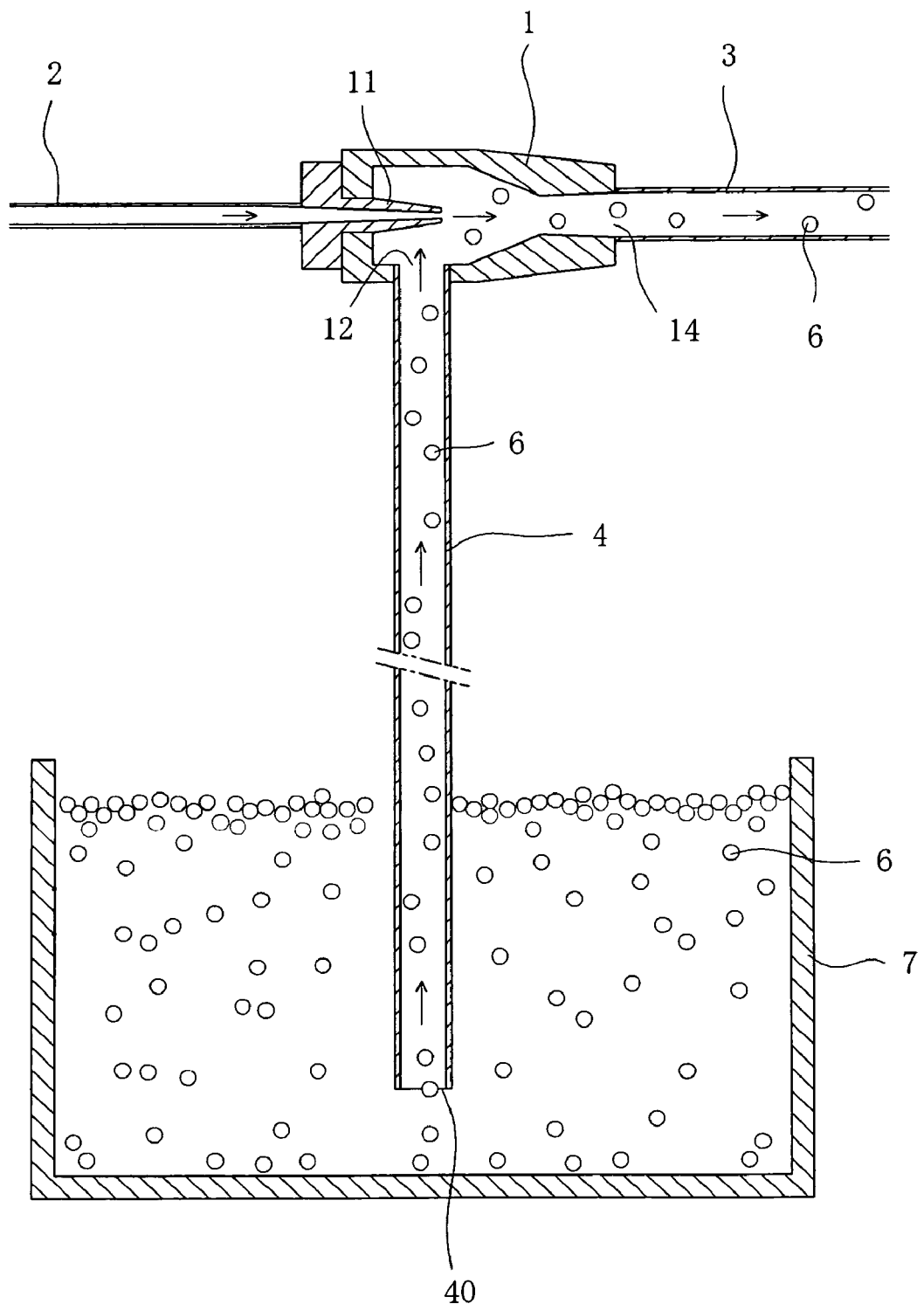
FIG. 7 is a cross-sectional view illustrating a conventional pellet loader.

FIG. 6 is a plan view illustrating a pellet loader of the present invention used in conjunction with a resin pellet drying machine. Referring to FIG. 6, the pellet loader of the present invention is connected to an airtight container 60 for storing resin pellets in a air proof manner, and the insert pipe 4 of the pellet loader is inserted among resin pellets stored in the airtight container 60. The airtight container 60 has a cone-shaped bottom 60a and the lower end of the insert pipe 4 reaches the deepest portion of the bottom 60a. In this case, the lower end of the insert pipe 4 is closed and the suction inlet is formed through periphery wall of the insert pipe 4 in the vicinity of the lower end of the pipe 4. The transport pipe 3 of the pellet loader is connected to the resin pellet drying machine 56. The resin pellet drying machine 56 supplies dried resin pellet to an injection molding machine 57. A controller 58 is connected to the resin pellet drying machine 56 through a gas line 59 for controlling the operation of the resin pellet drying machine 56. According to this embodiment, it is achieved to prevent moisture absorption of the resin pellets during storing and transporting the resin pellets and feed almost perfectly dried resin pellet into the injection molding machine.

The invention claimed is:

1. A pellet loader for transporting pellets (6) stored in a container (7) to a plastic processing machine (9) through a transport pipe (3) by compressed gas, comprising:
    an ejector portion (1);
    a compressed gas source (8);
    a gas supply pipe (2) for supplying said ejector portion (11) with compressed gas, one end of said gas supply pipe (2) being connected to said compressed gas source (8), the other end of said gas supply pipe (2) being connected to an injection nozzle (11) of said ejector portion (1);
    an insert pipe (4) adapted for insertion among the pellets (6) stored in said container (7), one end of said insert pipe (4) being connected to a suction inlet (12) of said ejector portion (1) and extending from said suction inlet (12), the other end of said insert pipe (4) having a suction inlet (40) for sucking said pellets (6) into said ejector portion (1); and
    a gas pipe (5) extending along said insert pipe (4), one end of said gas pipe (5) having an opening (50) positioned at the vicinity of the suction inlet (40) of said insert pipe (4) the suction inlet (40) of said insert pipe and the opening of said gas pipe in face to face engagement (4), compressed gas being supplied from the other end of said gas pipe (5);
    wherein said transport pipe (3) is connected to an outlet portion (14) of said ejector portion (1).

2. The pellet loader according to claim 1, wherein said opening (50) of said gas pipe (5) is provided with a nozzle (54 or 55) for injecting the compressed gas toward the suction inlet (40) of said insert pipe (4) in such a manner that the compressed gas flow spreads in a fan-like manner or conically.

3. The pellet loader according to claim 2, wherein said gas pipe (5) has another opening (52) airtightly connected and communicating with an opening (53) formed in the middle of said insert pipe (4) for injecting said compressed gas into said insert pipe (4).

4. The pellet loader according to claim 3, wherein said compressed gas is dried compressed gas.

5. The pellet loader according to claim 4, wherein said insert pipe (4) is arranged eccentrically to a center (11a) of the injection nozzle (11) of said ejector portion (1).

6. The pellet loader according to claim 5, wherein the suction inlet (40) of said insert pipe (4) is arranged obliquely to the axial direction of said insert pipe (4).

7. The pellet loader according to claim 6, wherein the other end of said gas pipe (5) is connected to a branch portion (20) of said gas supply pipe (2).

8. The pellet loader according to claim 7, wherein said container (7) is an airtight flexible bag or an airtight container.

* * * * *